United States Patent [19]

Lowe et al.

[11] 4,198,025
[45] Apr. 15, 1980

[54] VEHICLE SEATS

[75] Inventors: Frederick G. Lowe, Northampton; Bernard Bollons, Stratford-upon-Avon, both of England

[73] Assignee: UOP Inc., Des Plaines, Ill.

[21] Appl. No.: 962,496

[22] Filed: Nov. 20, 1978

[30] Foreign Application Priority Data

Nov. 29, 1977 [GB] United Kingdom ............... 49501/77

[51] Int. Cl.² ............................................. A47C 3/30
[52] U.S. Cl. ................................... 248/550; 248/588; 318/484
[58] Field of Search ................ 248/550, 588; 297/345, 297/347; 318/484; 361/170; 267/114, 117, 120

[56] References Cited

U.S. PATENT DOCUMENTS

| 2,545,343 | 3/1951 | Conviser | 318/484 X |
| 3,343,775 | 9/1967 | Stephanson | 248/550 |
| 3,606,233 | 9/1971 | Scharton et al. | 248/550 |
| 3,701,499 | 10/1972 | Schubert et al. | 248/550 |
| 3,787,025 | 1/1974 | Sturhan | 248/585 |
| 3,954,245 | 5/1976 | Costin | 248/550 |

Primary Examiner—Francis K. Zugel
Attorney, Agent, or Firm—James R. Hoatson, Jr.; Barry L. Clark; William H. Page II

[57] ABSTRACT

A vehicle seat has a seat part mounted on a base part by a suspension which includes a gas spring. Valve means are provided to control the seat ride position by controlling the entry and exit of compressed gas into and out of the gas spring. The difference between the actual ride position and a selected ride position of the seat is sensed, and a control circuit is used actuating the valve means to raise or lower the seat to reduce this difference to zero. In order to prevent seat vibration, such as is caused by passage of a vehicle over rough terrain, from continually causing actuation of the valve means, the control circuit is provided with desensitizing means.

8 Claims, 5 Drawing Figures

VEHICLE SEATS

BACKGROUND OF THE INVENTION

1. Field of the Invention

This invention relates to seat suspensions for vehicles, and to vehicle seats incorporating such suspensions.

2. Description of the Prior Art

It is well-known to provide a vehicle seat, in particular in a heavy goods vehicle, of the type in which a seat part is mounted on a base part by means of a spring suspension which isolates the seat part from at least some of the vibration of the vehicle cab on which the base part of the seat is mounted. The spring in such a suspension can be a mechanical spring, or a spring containing a charge of compressed air or other gas. It is also known to use such an air spring to vary the height of the seat part by providing a valve connecting the interior of the air spring to a source of compressed air. The valve can be opened manually to allow compressed air to enter the spring to counterbalance the weight of the seat occupant and to extend the air spring to a selected extent so that the seat occupant is located at the height he chooses. Another manually operable valve is provided to exhaust air from the air spring. An example of such a seat is disclosed in British Pat. No. 1,119,902 in which manual operation of a lever causes the seat to be raised or lowered automatically to a selected or preselected ride height.

In order however for such a system to be fully effective it is desirable that it should operate automatically, for example upon the seat occupant sitting on the seat. If it is left to the seat occupant to switch it on at will, he is liable to fail to do so and drive the vehicle with the seat at an incorrect height. If however the device is automatically switched on for example by switching on the vehicle's ignition circuit, or by a seat-operated switch responsive to load on the seat, so that it remains switched on while the seat is occupied, movement of the vehicle over rough terrain will produce the same response as repeatedly changing the weight of the seat occupant, and the seat will repeatedly rise and fall.

SUMMARY OF THE INVENTION

According to one aspect of the present invention there is provided a vehicle seat comprising a base part, a suspension including a gas spring, a seat part mounted on the suspension for upward and downward resilient movement relative to the base part, a source of compressed gas, valve means connecting the interior of the gas spring selectively to the source of compressed gas and to atmosphere, and electric circuit means including sensing means operative to sense any displacement of the seat part from a selected ride position, means operable in response to said sensing means for actuating the valve means to allow compressed gas to enter or leave the gas spring until the seat part has returned to its selected ride position, and desensitizing means for inhibiting the electric circuit means from raising or lowering the seat part in response merely to vibrational movement of the seat part relative to the base part.

According to another aspect of the present invention there is provided a vehicle seat comprising a base part, a seat part, a suspension mounting the seat part on the base part for upward and downward resilient movement relative thereto, said suspension including a gas spring, a source of compressed gas, valve means connecting the interior of the gas spring selectively to a source of compressed gas and to atmosphere, and electric circuit means including sensing means arranged to sense displacement of the seat part from a selected ride position and to output a corresponding signal, means arranged to receive said signal and to actuate the valve means in response thereto to allow compressed gas to enter or leave the gas spring until the seat has returned to its selected ride position, and averaging means arranged normally to average said signal prior to receipt by the valve-actuating means to reduce the possibility of the valve-actuating means causing raising or lowering of the seat part in response merely to vibrational movement of the seat part relative to the base part, said averaging means being de-activatable to enable the valve-actuating means to be directly responsive to said signal under pre-determined operational conditions of the seat.

BRIEF DESCRIPTION OF THE DRAWINGS

One embodiment of the present invention will now be described, by way of example only, with reference to the accompanying drawings in which.

DESCRIPTION OF THE PREFERRED EMBODIMENT

Figure 1:
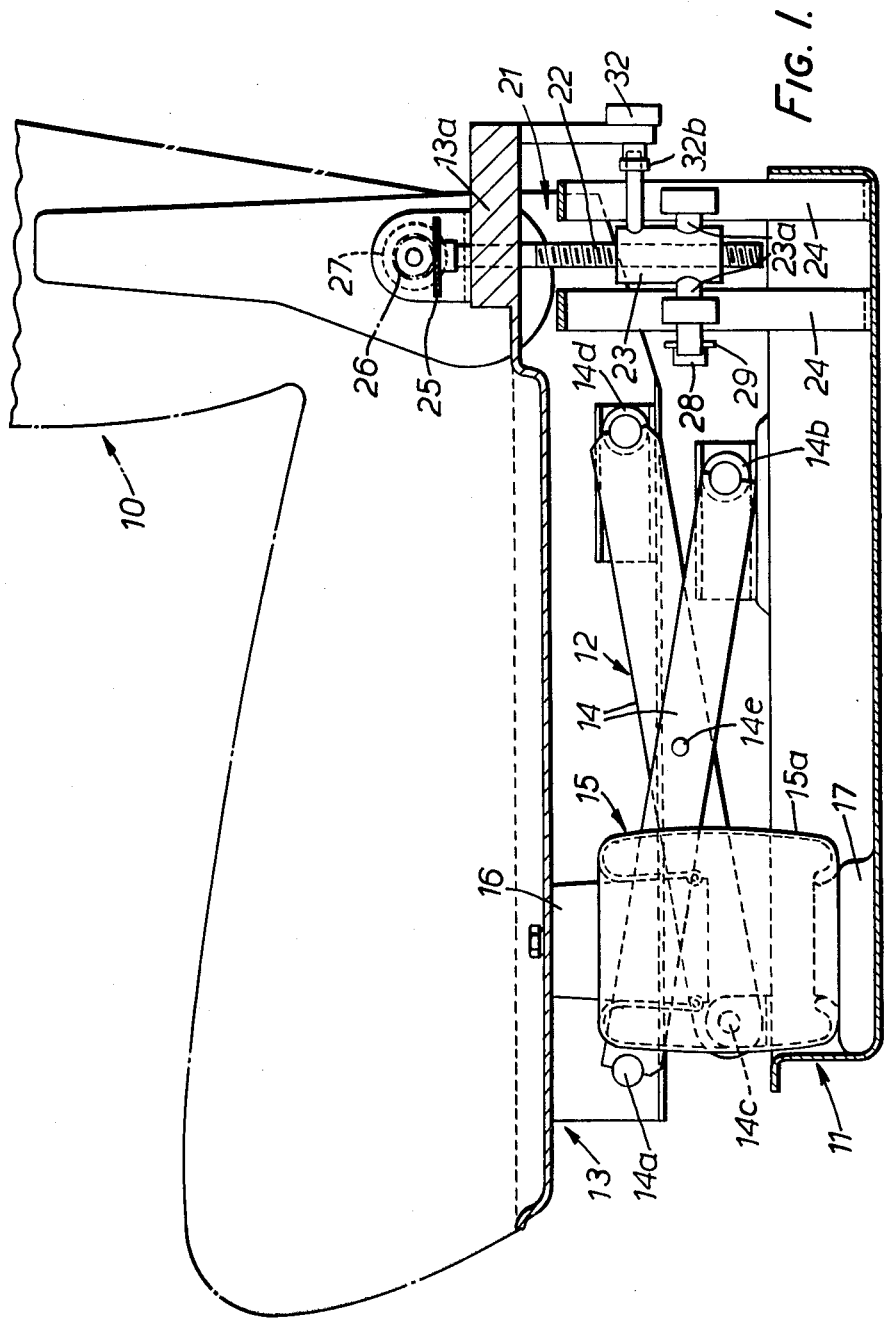
FIG. 1 is a diagrammatic section through a vehicle seat incorporating a seat suspension which includes an air spring.

As shown in FIG. 1, the vehicle seat comprises a seat part 10 mounted on a base part 11 via a spring suspension 12. The spring suspension comprises a seat support 13 on which the seat part 10 is mounted, two pairs of scissor arms 14 located in laterally-spaced vertical planes (only one pair shown), one arm of each pair having a pivotal connection 14a at one end to the seat support 13 and a sliding or rolling connection 14b at the other end to the base part 11, the other arm of each pair having a pivotal connection 14c to the base part 11 and a sliding or rolling connection 14d to the seat support 13. The arms 14 are pivotally interconnected at their intersection at 14e. This system of pivoted linkages maintains the seat part horizontal as it rises and falls relative to the base part. Details of a seat of this type are described in our British Pat. No. 957,332.

In addition, an air spring 15 is connected between the base part 11 and the seat support 13, the air spring consisting of a tubular rubber envelope 15a the ends of which have been folded inwardly and each secured around the rim of upper and lower support members 16, 17 fixed respectively to the seat support 13 and the base part 11. The upper member 16 is cup-shaped, the outer surface of member 16 providing a support for the rolling lobe of the tubular envelope 15a as the seat support rises and falls.

Figure 2:
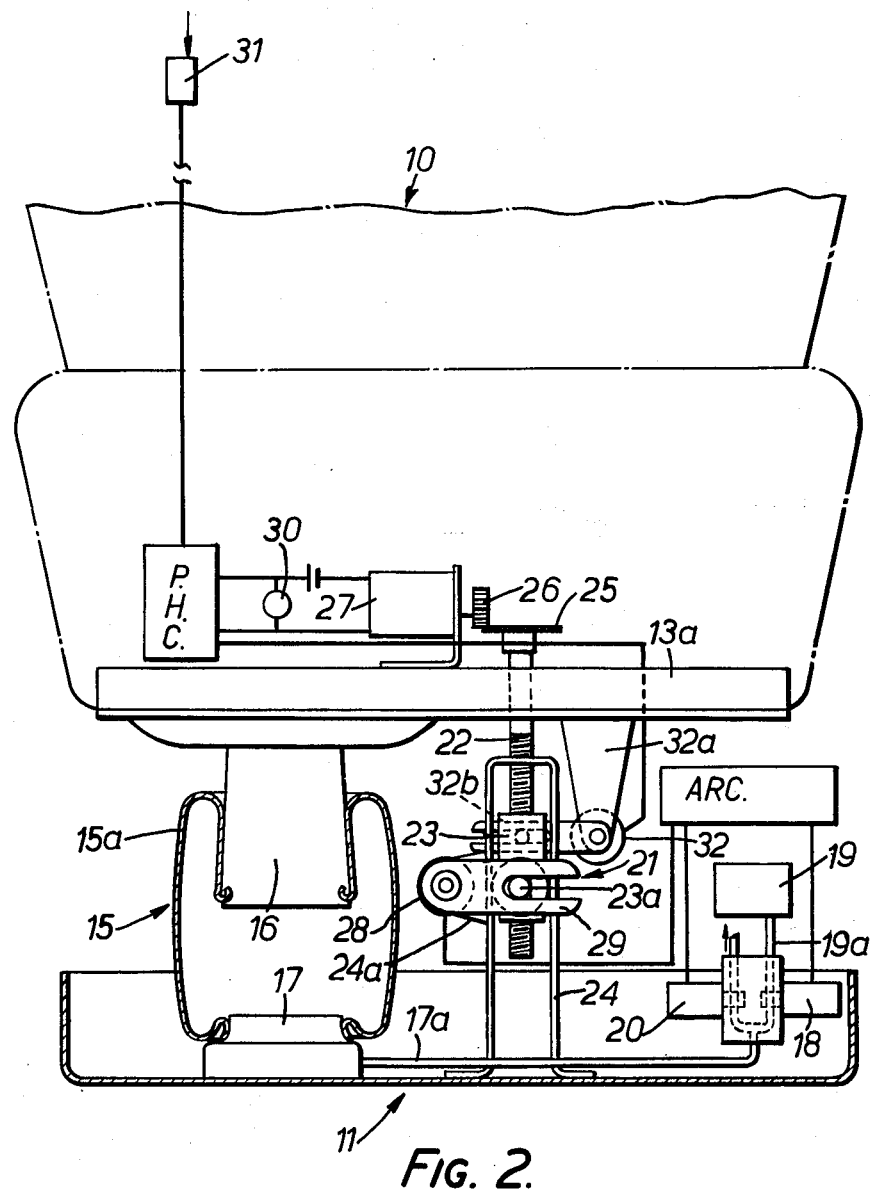
FIG. 2 is a diagrammatic representation of the seat, as seen from the front, illustrating the association between the mechanism and operating circuits for controlling the flow of compressed air into and out of the spring, details of the seat suspension having been omitted and the seat part being shown only in ghostline.

A source 19 of compressed air or other gas (FIG. 2), which can conveniently comprise a reservoir of compressed gas supplied by an electrically-driven compressor (not shown), is connected via an air line 19a to a solenoid-operated inlet valve 18 which in turn is connected to the interior of the gas spring 15 via a combined inlet and outlet pipe 17a extending through the lower support member 17. The pipe 17a is also connected to atmosphere through a solenoid-operated outlet valve 20.

Connected between the base part 11 and the seat support 13 is a position-responsive device 21 comprising a lead screw 22 extending vertically and journalled at its upper end in a trunnion 13a on the seat support 13 for rotation about its longitudinal axis, for a purpose to be described hereinafter. The lead screw 22 supports a nut 23 which is anchored against rotation by engagement in a guide formed by vertically-extending spaced-apart u-section guide members 24. The nut 23 can, however, rise or fall by sliding within the guide as the seat part 10 rises or falls relative to the base part 11.

The vertical distance of the nut 23 from a selected height is sensed by a potentiometer 28 supported on an arm 24a secured to one guide member 24 and thus mounted on the base part 11. The potentiometer 28 is a rotary device having a rotatable slider connected to a radial arm 29 forked at its outer end to engage around a pin 23a extending horizontally from the nut 23. The upward and downward movement of the nut 23, as a result of vertical movement of the seat part 11, causes the arm 29 to rise pivotally above or fall below the selected height, referred to as the selected mid-ride position, for the seat part 10, and this pivotal movement of the arm varies the potentiometer. Consequently, the potentiometer is effective to sense the position of the seat part 10 relative to its normal mid-ride position. This mid-ride position (sometimes abbreviated to 'ride position') is usually arranged to be midway between UP and DOWN stop positions of the seat and in this position the arm 29 is horizontal, as illustrated. The potentiometer 28 is connected into an automatic ride control circuit A.R.C. which will cause air to enter or leave the air spring to bring the seat back to its mid-ride position in which the radial arm 29 is horizontal.

Figure 3:
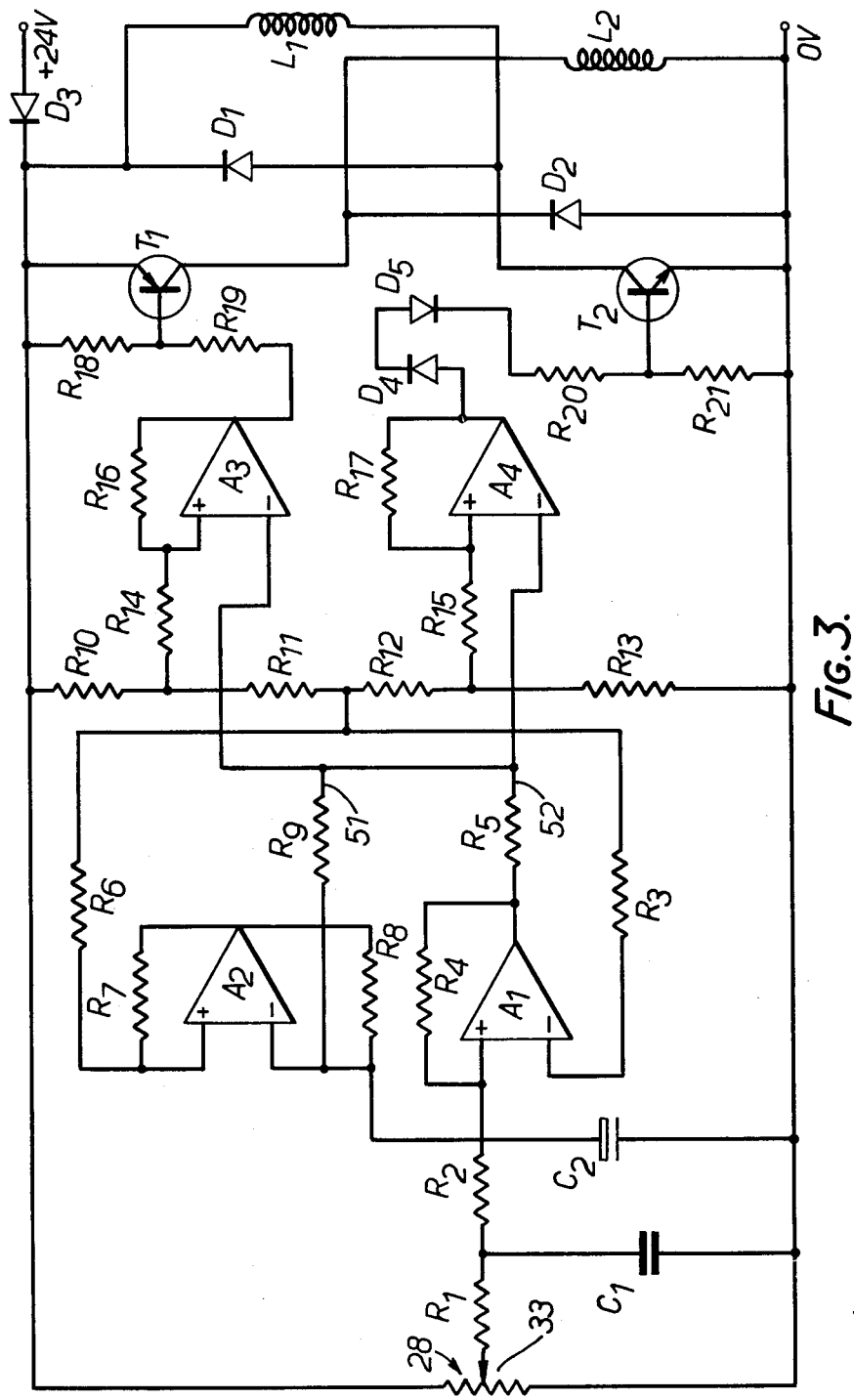
FIGS. 3 and 4 are diagrams of the operating circuits of the seat suspension.

The automatic ride control circuit of the seat suspension is illustrated in FIG. 3. As shown, the circuit comprises the solenoids $L_1$ and $L_2$ of the air spring solenoid valves 18 and 20. The solenoids $L_1$ and $L_2$ are respectively connected into the collector circuits of transistors $T_2$ and $T_1$. The transistors $T_2$ and $T_1$ are respectively driven by the outputs of operational amplifiers $A_4$ and $A_3$. When the output of the amplifier $A_4$ is high, the transistor $T_2$ is turned on and the solenoid $L_1$ is energised to open inlet valve 18 and inflate the air spring, whereas when the output of the amplifier $A_4$ is low the transistor $T_2$ is cut off and the solenoid $L_1$ is de-energised to shut off the compressed air supply. Conversely, high and low outputs from the amplifier $A_3$ respectively de-energise solenoid $L_2$ to close the outlet valve and energise the solenoid $L_2$ to open the outlet valve 20 and deflate the air spring. Both solenoids $L_1$ and $L_2$ will be de-energised when the output of the amplifier $A_4$ is low and that of the amplifier $A_3$ is high.

The amplifiers $A_3$ and $A_4$ are configured as fixed gain trigger amplifiers and are respectively provided with feedback resistors $R_{16}$ and $R_{17}$ and input resistors $R_{14}$ and $R_{15}$. A composite common signal input is fed to the inverting inputs of the amplifiers $A_3$ and $A_4$ and is a combination of signals supplied on lines 51 and 52. The signal supplied on the line 51 is derived via a resistor $R_5$, a fixed gain operational amplifier $A_1$ and resistors $R_2$ and $R_1$ from the slider 33 of the potentiometer 28.

A resistance chain formed by the resistors $R_{10}$ to $R_{13}$ generates first and second threshold voltage levels which are fed to the non-inverting inputs of the amplifiers $A_4$ and $A_3$ respectively. The second threshold voltage level is made greater than the first threshold voltage level. When the common signal input is at a voltage level intermediate the first and second threshold voltage levels, the outputs of the amplifiers $A_4$ and $A_3$ will respectively be low and high with the result that both the solenoids $L_1$ and $L_2$ are de-energised. Should the common signal input voltage level fall below the first threshold level, the output of the amplifier $A_4$ will become high causing the solenoid $L_1$ to be energised; if the common signal input voltage rises above the second threshold level the output of the amplifier $A_3$ will become low causing the solenoid $L_2$ to be energised.

In addition to the signal derived from the potentiometer 28, a triangular waveform voltage is also fed via a resistor $R_9$ and the line 51 to the coupled inverting inputs of the amplifiers $A_3$ and $A_4$. This triangular waveform is generated by an operational amplifier $A_2$ connected with the resistors $R_7$ and $R_8$ and with the capaciter $C_2$ to form a multivibrator of standard configuration. The triangular waveform is effectively summed with the signal from the output of the amplifier $A_1$ at the inverting inputs to the amplifiers $A_3$ and $A_4$ to produce a common signal input of triangular form with a mean value dependent on the potentiometer signal.

The first and second threshold voltage levels and the peak-to-peak voltage of the triangular waveform are set such that in the mid-ride position for the seat (the slider of the potentiometer 28 being at a mid position corresponding to arm 29 being horizontal), the mean value of the common signal input lies midway between the threshold levels and the positive and negative voltage excursions of the common signal input caused by the triangular waveform do not quite exceed the second and first threshold levels respectively.

In operation of the circuit, displacements of the seat from its mid-ride position will cause corresponding variations in the mean value of the common signal input fed to the amplifiers $A_3$ and $A_4$ resulting in either the first or second threshold voltage levels being exceeded by the negative or positive excursions of the common signal input according to the direction of displacement of the seat. As a result, the corresponding solenoid $L_1$ or $L_2$ is pulsatingly energised thus either admitting air to, or releasing air from, the air spring to restore the seat to its mid-ride position. The control effected by the circuitry is a proportional one (that is, the duty cycle of the energised solenoid is proportional to the magnitude of seat displacement from its mid-rise position) until the seat displacement is sufficiently large to cause the value of the common signal input to the amplifiers $A_3$ and $A_4$ to exceed continuously either the first or second threshold level respectively. In this case, the corresponding solenoid valve 18 or 20 will be continuously energised until the seat is restored to a position where the threshold level is only intermittently exceeded.

The rate of pulsing of the solenoids $L_1$ and $L_2$ can be adjusted for optimum performance by adjusting the values of resistor $R_8$ and/or capacitor $C_2$ to adjust the frequency of the triangular waveform generated.

A diode $D_3$ is provided to protect the circuit against reverse polarity connection of the supply. Diodes $D_1$ and $D_2$ are provided to suppress back e.m.f.s. across the solenoids $L_1$ and $L_2$ on switch-off of the circuit supply. Diodes $D_4$ and $D_5$ are provided to ensure that transistor $T_2$ is completely off when the output of the amplifier $A_3$ is low.

Reference voltages for the amplifiers $A_1$ and $A_2$ are derived via resistors $R_3$ and $R_6$ respectively from the common point of the resistors $R_{11}$ and $R_{12}$. The amplifiers $A_1$ to $A_4$ are, for example, standard integrated circuit operational amplifiers and may also be provided in a single integrated circuit.

In order to allow the seat occupant to select the height of the mid-ride position of the seat, the nut 23 is arranged to be adjustable in position towards and away from the seat part 10. Adjustment of the position of the nut 23 is effected by means of an electric motor 27 provided with a pinion 26 arranged to rotate the lead screw 22 by engagement with a gear wheel 25 mounted on the upper end of the lead screw 22. Since the ride control circuit will control the air spring 15 to maintain the radial arm 29 in a particular datum position (for example, horizontal), vertical adjustment of the nut 23 is effective to alter the seat height corresponding to the datum position of the arm 29, and therefore to alter the mid-ride position of the seat.

The energisation of the motor 27 from the vehicle battery can be simply controlled by a control and reversing switch 30, mounted for example on the seat part, and by means of which the seat occupant can select the desired midride position. Thus, if the seat occupant wishes to raise or lower his mid-ride position, he will do so by operating the switch 30 to energise the motor 27 in one or other direction and raise or lower the nut 23 relative to the base part. This will have the effect of moving the potentiometer 28 away from its mid-position and will cause one of the air valves 18, 20 to be actuated under the control of the ride control circuit to bring the seat to its new mid-ride position.

From the foregoing, it can be seen that the automatic ride-control circuit is effective to maintain the seat at a mid-ride position in which the weight of the seat occupant is balanced and the seat occupant is maintained at a height which he can select.

In order to prevent vibration of the seat, e.g. resulting from passage of the vehicle over rough terrain, from causing the ride control circuit constantly to actuate the inlet and outlet valves 18 and 20 of the air spring 15, a time-delay circuit formed by the resistor $R_1$ and capacitor $C_1$ is incorporated in the ride control circuit, the time constant of which is such, for example, that any change in the position of the seat which is maintained for less than 3 seconds fails to cause operation of either valve 18 or 20 of the air spring 15.

The disadvantage of such a delay circuit, is that if the seat occupant uses the energisation control switch 30 of the motor 27 to adjust the seat height, he will be disappointed to find that initially, due to the 3 second delay introduced by the delay circuit, the seat takes some time to respond and then continues to rise or fall after he has discontinued motor energisation. This response characteristic for seat control makes it difficult for a desired seat height to be achieved accurately for someone unaccustomed to the control.

One way of overcoming this difficulty is to provide a preselected seat height control circuit PHC in addition to, or preferably in substitution for, the motor control switch 30. The circuit includes a position control servo in which the seat occupant sets the slider on an input potentiometer 31 (mounted, for example on the dashboard) to a position corresponding to a desired seat ride height, the servo being operative to energise the motor 27 to adjust the nut 23 to a position corresponding to the desired seat ride height. The ride control circuit A.R.C. will, after a delay, control the air spring control valves 18 and 20 to set the seat accordingly.

Figure 4:
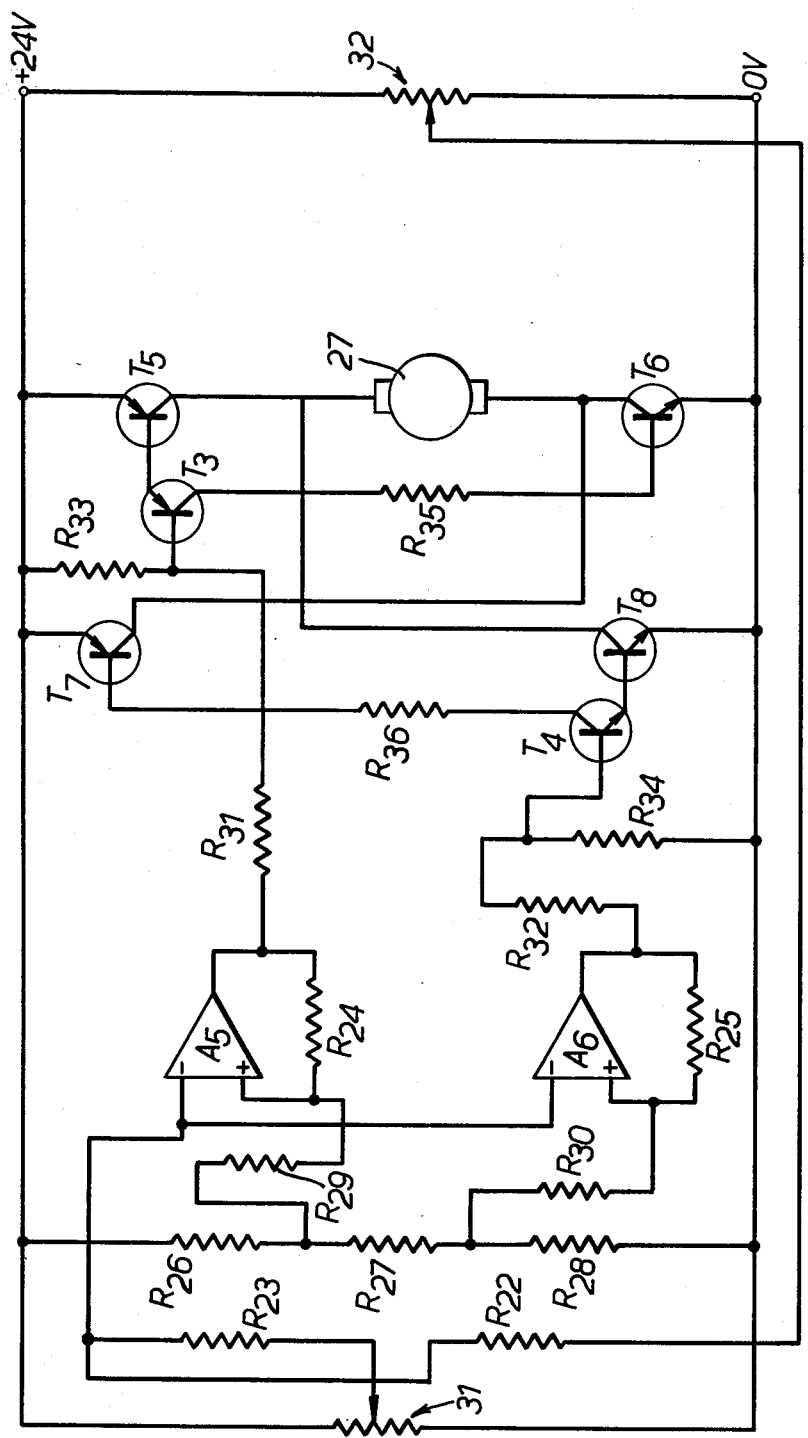

A suitable height control servo is shown in FIG. 4. The desired seat ride position (which can be thought of as the desired position of the nut 23, relative to the trunnion 13a, since the position of the nut determines the ride position) is selected using the input potentiometer 31. The actual position of the nut 23 is sensed by a potentiometer 32 mounted on a support 32a rigid with trunnion 13a and adjustable by a coupling 32b connecting it to the nut 23 (such as a radial arm and pin coupling operable in the manner of forked radial arm 29 and pin 23a). The potentiometer 32 thus gives a true indication of the position of the nut 23 relative to the seat part 13. The output from the potentiometer 32 is fed via a resistor $R_{22}$ to the common input of amplifiers $A_5$ and $A_6$ to form a signal indicative of the error between the desired and actual position of the nut 23. When the desired and actual positions of the nut 23 correspond, this signal has a voltage midway between the supply rails. This signal is fed to the common input resistor $R_{23}$ of fixed gain operational amplifiers $A_5$ and $A_6$ provided with feedback resistors $R_{24}$ and $R_{25}$ respectively. The resistor $R_{23}$ is connected to the inverting inputs of the amplifiers $A_5$ and $A_6$, the non-inverting inputs being fed with respective reference voltages via respective resistors $R_{29}$ and $R_{30}$ from a resistor chain formed by resistors $R_{26}$, $R_{27}$ and $R_{28}$.

The output of the amplifier $A_5$ is connected via resistor $R_{31}$ to a driver transistor $T_3$ which when turned on by a low output from the amplifier $A_5$, renders the transistors $T_5$ and $T_6$ conducting to pass current in one direction through the motor 27. When the output of the amplifier $A_5$ is high, the transistors $T_3$, $T_5$ and $T_6$ are non-conducting.

Similarly, the output of the amplifier $A_6$ is connected via resistor $R_{32}$ to a driver transistor $T_4$ which when turned on by a high output from the amplifier $A_6$, renders transistors $T_7$ and $T_8$ conductive to pass current in the opposite direction through the motor 27. When the output of the amplifier $A_6$ is low the transistors $T_4$, $T_7$ and $T_8$ are non-conducting.

The FIG. 4 servo is a bang-bang servo having a dead band set by the value of $R_{27}$ which determines the values of the reference voltages fed to the amplifiers. When the desired and actual positions of the nut 23 correspond, the voltage fed to the inverting inputs of the amplifiers $A_5$ and $A_6$ lies in the dead band between the reference voltages and the output of these amplifiers are respectively high and low; as a result no current flows through the motor 27.

Small differences between desired and actual positions of the nut 23 will still result in the voltage fed to the inverting inputs of the amplifiers $A_5$ and $A_6$ lying between the reference voltages with the result that the motor 27 remains de-energised.

As the difference between the desired and actual positions of the nut 23 increases (for example, due to the desired position being altered by the seat occupant operating the potentiometer 31) the voltage fed to the inverting inputs of the amplifiers $A_5$ and $A_6$ will pass out of the dead band through one or other of the reference voltages causing the corresponding amplifier to change its output state which in turn results in current flow through the motor 27 in a direction tending to bring the servo back into balance. The servo is thus effective to move the nut 23 to a position predetermined by the position of the slider of the potentiometer 31.

Use of the servo thus enables the seat occupant to pre-select his desired seat ride position. However, the presence of the time delay circuit means that the seat will not respond instantaneously.

An alternative way of overcoming the disadvantages inherent in the provision of a continuously operating time-delay circuit is to arrange for the time delay circuit to be cut out whenever the motor 27 is energised. Such an arrangement which can be optionally used in conjunction with the seat height control servo comprises in its simplest form a switch (not shown) operative to connect or disconnect the capacitor $C_1$ (FIG. 3) to the common point between resistors $R_1$ and $R_2$ in correspondence to energisation of the motor 27. Thus during adjustment of the seat ride position the time-delay circuit is cut out whereas, during normal riding, the time-delay circuit is operative to render the ride-control circuit insensitive to transient variations in seat ride-height. Where a motor control switch 30 is provided either jointly with the seat height control servo or on its own, then control of the switch used to connect or disconnect the capacitor $C_1$ is most simply effected by ganging the switch to the control switch 30.

In practice it is preferable that the capacitor $C_1$ is switchable out of circuit electronically and a suitable form of electronically de-activatable time-delay circuit will now be described with reference to FIG. 5 which is a circuit diagram of a modified automatic ride-control circuit provided with a motor control switch 30.

Figure 5:
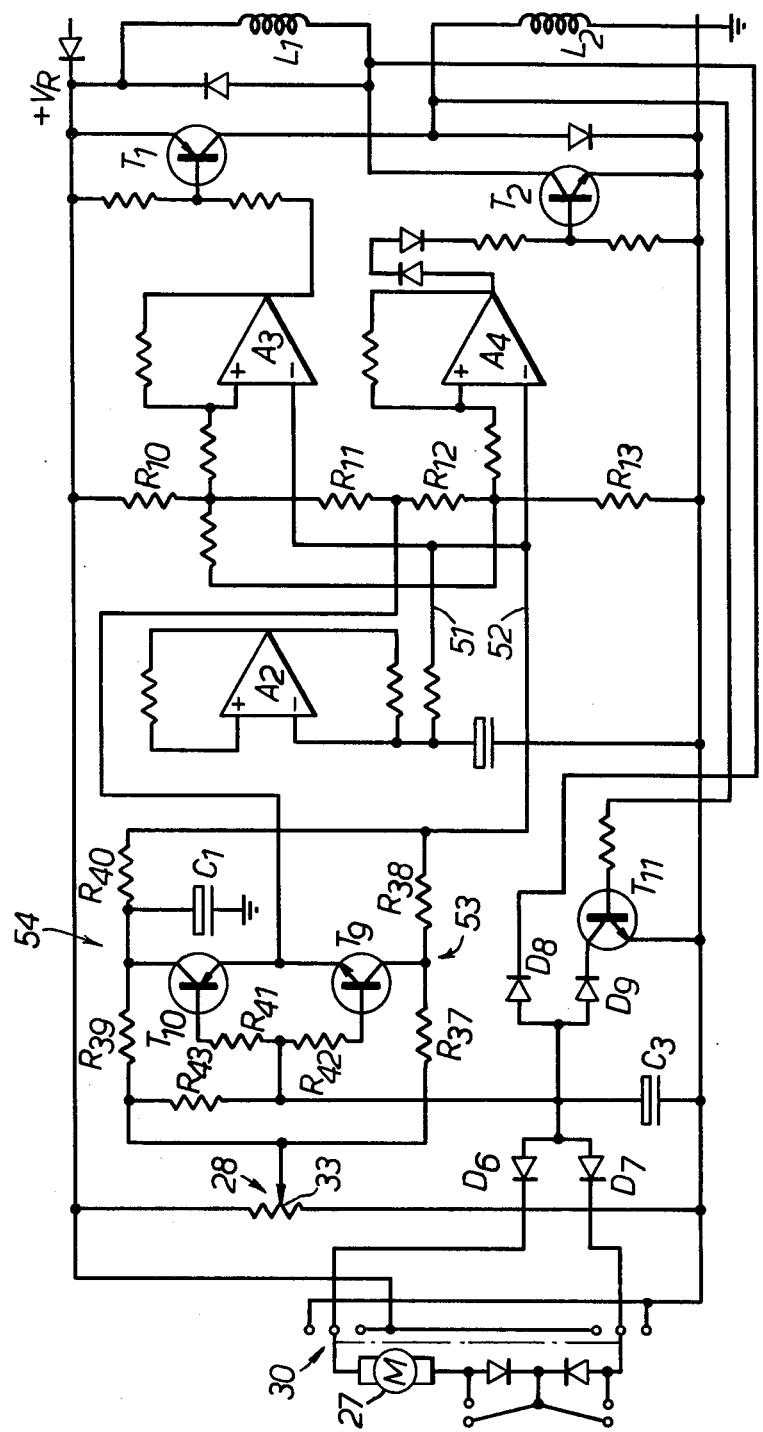
FIG. 5 is a diagram of a modified form of the FIG. 3 circuit.

The front end of the FIG. 5 circuit is similar to that shown in FIG. 3 with the amplifiers $A_3$ and $A_4$ acting as upper and lower threshold voltage detectors for the common input signal formed by the combination of the voltage signals supplied on lines 51 and 52. The signal on line 51 is the triangular waveform voltage supplied from a generator built around amplifier $A_2$, and the signal on line 52 is the voltage dependent on the position of the slider 33 of the potentiometer 28. In contrast to the FIG. 3 circuit in which the potentiometer-dependent signal is fed from the slider 33 to the amplifiers $A_3$ and $A_4$ via the time delay circuit (components $R_1$ $C_1$) and an amplifier $A_1$, in the FIG. 5 circuit the potentiometer-dependent signal passes to the amplifiers $A_3$ and $A_4$ via an electronically-de-activatable time-delay or averaging circuit.

The FIG. 5 time-delay circuit provides two circuit paths between the slider 33 of the potentiometer 28 and the line 52, these being a no-delay circuit path 53 incorporating series-connected resistors $R_{37}$ and $R_{38}$, and a delay circuit path 54 incorporating series-connected resistors $R_{39}$ and $R_{40}$ and the averaging capacitor $C_1$. The capacitor $C_1$ is connected between the common point of the resistors $R_{39}$ and $R_{40}$ and ground.

Normally the signal from the potentiometer slider 33 passes to line 52 along the delay circuit path 54 with the no-delay path 53 being inhibited; however, the time-delay circuit can be selectively rendered inoperative by the delay path 54 being inhibited while the no-delay path 53 is allowed to pass the potentiometer slider signal undelayed to the line 52.

The no-delay circuit path 53 is arranged to be inhibited by the switching on of a control transistor $T_9$. The collector of the transistor $T_9$ is connected between the resistors $R_{37}$ and $R_{38}$ while its emitter is held at mid-rail voltage, that is, a voltage midway between the ground rail and the positive supply rail; the mid-rail voltage is derived from a resistance chain formed by the resistors $R_{10}$ to $R_{13}$. The transistor $T_9$ is an NPN transistor and will therefore be turned on by a positive voltage greater than the mid-rail one.

In a similar manner the delay circuit path 54 is arranged to be inhibited by the switching on of a control transistor $T_{10}$. The collector of the transistor $T_{10}$ is connected between the resistors $R_{39}$ and $R_{40}$ while its emitter is held at the mid-rail voltage. The transistor $T_{10}$ is a PNP transistor and will therefore be turned on by a voltage less than the mid-rail one.

The bases of the control transistor $T_9$ and $T_{10}$ are interconnected via respective base resistors $R_{41}$ and $R_{42}$ to enable the transistors to be controlled by a common control signal. It will be appreciated that this arrangement results in one control transistor $T_9$ or $T_{10}$ being turned on while the other is turned off, the actual transistor $T_9$ or $T_{10}$ turned on being dependent on whether the common control voltage is above or below the mid-rail voltage.

In this manner the common control voltage can be used to inhibit the no-delay or delay circuit path 53 or 54 as desired.

The common point between the base resistors $R_{41}$ and $R_{42}$ is connected to the positive supply rail via a resistor $R_{43}$ and to the ground rail via a capacitor $C_3$; the common control signal will thus normally be at the positive rail potential and the no-delay circuit path 53 will therefore normally be inhibited while the delay path 54 will normally be enabled.

Upon energisation of the motor 27, the potential at the common point between the resistors $R_{41}$ and $R_{42}$ is arranged to be clamped approximately to ground and therefore to inhibit the delay circuit path 54 while enabling the no-delay path 53. This is achieved by connecting the anodes of diodes $D_6$ and $D_7$ to the common point between the resistors $R_{41}$ and $R_{42}$ and connecting the cathodes of these diodes to the switch 30 such that upon operation of the switch 30 to energise the motor 27, one or other of the diodes $D_6$ and $D_7$ (depending on the polarity of motor energisation) has its cathode connected to ground.

The potential at the common point between the resistors $R_{41}$ and $R_{42}$ is also arranged to be clamped approximately to ground upon energisation of either one of the solenoids $L_1$ and $L_2$; this is achieved by the connection of the anodes of diodes $D_8$ and $D_9$ to the common point between resistors $R_{41}$ and $R_{42}$ and the connection of the cathodes of these diodes respectively directly and via an invertor (transistor $T_{11}$) to the collectors of transistors $T_2$ and $T_1$.

During periods when neither the motor 27 nor either one of the solenoid $L_1$ and $L_2$ is energised, the time-delay circuit operates in its normal delay or averaging mode, the no-delay circuit path 53 being inhibited while the delay path 54 is enabled. The capacitor $C_1$ will change its state of charge at a rate dependent on the value of the differential voltage between itself and the slider 33 of the potentiometer 28 and also on the value of the resistor $R_{39}$. In the mid-ride position of the seat, the voltage appearing on the potentiometer slider 33 is arranged to be the mid-rail voltage and this is the normal voltage across the capacitor $C_1$. As the seat is displaced from its mid-ride position the capacitor voltage will begin to change but will lag behind the change in slider voltage. Of course, the greater the displacement of the seat from its mid-ride position, the faster the capacitor $C_1$ will charge and the shorter the time-delay before the voltage on the line 52 changes to a level sufficient to cause energisation of one of the solenoids $L_1$ and $L_2$. The overall ride control circuit will thus respond more quickly to large displacements of the seat.

Upon energisation of the motor 27 or of either solenoid $L_1$ or $L_2$, the no-delay circuit path 53 is enabled and the delay path 54 is inhibited thus effectively rendering the time-delay circuit inoperative. The ride control circuit will now respond at once to displacement of the seat from its mid-ride position.

Upon return to a condition in which neither solenoid $L_1$ or $L_2$, nor the motor 27 is energised, the common control signal fed to the bases of transistors 9 and 10 will not immediately return to positive rail potential since capacitor $C_3$ must first be charged through resistor $R_{43}$. As a result, re-activation of the time-delay circuit is delayed for a short period which ensures that the circuit is not prematurely re-activated for example by the seat during an overshoot of its mid-ride position.

In summary, it can be seen that the time-delay circuit shown in FIG. 5 normally passes the signal from the potentiometer slider 33 to the line 52 via the delay circuit path 54 so that seat positional errors maintained only for a short time (such as are caused by vibrations) do not result in activation of either air valve 18 or 20; however during energisation of the motor 27 to adjust the selected seat ride position or of either solenoid $L_1$ or $L_2$, the potentiometer slider signal passes undelayed along the no-delay circuit path 53 to the line 52.

It should be noted that when the delay-path 54 is inhibited the capacitor $C_1$ is connected to the mid-rail voltage. As a result, upon the delay circuit path 54 being enabled the capacitor $C_1$ is already in a state of charge corresponding to the seat mid-ride position. In the absence of such an arrangement, the ride control circuit would erroneously energise one of the solenoids $L_1$ or $L_2$ while the capacitor $C_1$ charged up.

In a modification of the above-described electronically-de-activatable time-delay circuit, a resistor (not shown) is connected in parallel with the capacitor $C_1$ to act as a bleed resistor discharging the capacitor $C_1$ to ground. Obviously the rate of discharge of the capacitor $C_1$ would be greater for capacitor voltages above mid-rail level than below. This has the effect of decreasing the sensitivity of the ride control circuit to voltages above mid-rail level, that is to displacements of the seat above the mid-ride position. Since vehicle braking has the effect of raising the seat, such an asymmetrical sensitivity characteristic of the ride control circuit can be an advantage. Of course, by connecting the bleed resistor to the positive supply rail instead of to ground a reverse sensitivity asymmetry could be achieved.

The pre-selected seat height control circuit PHC (see FIG. 4) can of course be used jointly with or instead of the motor control switch 30 in the FIG. 5 circuit.

We claim:

1. A vehicle seat comprising a base part, a suspension including a gas spring, a seat part mounted on the suspension for upward and downward resilient movement relative to the base part, a source of compressed gas, valve means connecting the interior of the gas spring selectively to the source of compressed gas and to atmosphere, and electric circuit means including sensing means operative to sense any displacement of the seat part from a selected ride position, means operable in response to said sensing means for actuating the valve means to allow compressed gas to enter or leave the gas spring until the seat part has returned to its selected ride position, desensitizing means for inhibiting the electric circuit means from raising or lowering the seat part in response merely to vibrational movement of the seat part relative to the base part, an electric motor driven seat height control means operable to change the response of the sensing means and thereby cause the selected ride position to be raised or lowered, a coupling interconnecting the seat part and base part, two members of said coupling being relatively movable in response to upward or downward movement of the seat part relative to the base part thereby to change the response of the sensing means, and wherein said seat height control means is operable to vary the relative static position of said coupling members and thereby vary the response of the sensing means, said desensitizing means comprising time delay means operable to prevent activation of the valve means by said sensing means in response to any displacement of the seat part from the ride position which is maintained for less than a predetermined time period, and de-activation means arranged to render said time delay means inoperative during energisation of the said electric motor of the height control means.

2. A vehicle seat according to claim 1 having a switch manually operable to cause the motor to be driven in either a forward or a reverse direction.

3. A vehicle seat according to claim 1, including a manually-operable pre-selecting ride position control device connecting said motor in a servo circuit by means of which the motor is driven to a position corresponding to the ride position selected at said control device.

4. A vehicle seat according to claim 1, wherein said de-activation means is further arranged to render said time delay means inoperative during activation of said valve means.

5. A vehicle seat according to claim 1 wherein said sensing means is a potentiometer which is variable in response to upward or downward movement of the seat part relative to the base part.

6. A vehicle seat comprising a base part, a seat part, a suspension mounting the seat part on the base part for upward and downward resilient movement relative thereto, said suspension including a gas spring, a source of compressed gas, valve means connecting the interior of the gas spring selectively to a source of compressed gas and to atmosphere, and electric circuit means including sensing means arranged to sense displacement of the seat part from a selected ride position and to output a corresponding signal, means arranged to receive said signal and to actuate the valve means in response thereto to allow compressed gas to enter or leave the gas spring until the seat has returned to its selected ride position, averaging means arranged normally to average said signal prior to receipt by the valve-actuating means to reduce the possibility of the valve-actuating means causing raising or lowering of the seat part in response merely to vibrational movement of the seat part relative to the base part, said averaging means being de-activatable to enable the valve-actuating means to be directly responsive to said signal under pre-determined operational conditions of the seat, adjustment means operable to change said selected ride position, said averaging means comprising a delay circuit path and a no-delay circuit path in parallel and both arranged to receive said signal from the sensing means, the delay circuit path being operative to average said signal in passage therealong, and control means normally inhibiting said no-delay circuit path while enabling the delay circuit path, the control means being operative in response to energisation of said adjustment means to inhibit said delay circuit path and enable the no-delay circuit path.

7. A seat according to claim 6, in which said averaging means is arranged to be de-activated during operation of said adjustment means.

8. A seat according to claim 7, in which said averaging means is arranged to be de-activated during activation of said valve means.

* * * * *